United States Patent [19]
Chen

[11] Patent Number: 5,331,127
[45] Date of Patent: Jul. 19, 1994

[54] DUAL PUSH-PULL INDUCTION HEATING DRIVE CIRCUIT

[76] Inventor: Su-Min Chen, No. 9, Yung Duang Lane, Herming Village, Show Shui Hsiang, Chang Hwa Hsien, Taiwan

[21] Appl. No.: 858,283
[22] Filed: Mar. 26, 1992
[51] Int. Cl.$^5$ ............................................. H05B 6/06
[52] U.S. Cl. ................................. 219/661; 219/660; 219/664; 363/97; 323/262
[58] Field of Search ............... 219/10.77, 10.75, 10.79, 219/10.493, 10.57; 363/136, 97, 134, 131, 65; 375/36, 84; 323/282, 262

[56] References Cited

U.S. PATENT DOCUMENTS

| | | | |
|---|---|---|---|
| 4,358,654 | 11/1982 | Estes | 219/10.77 |
| 4,426,564 | 1/1984 | Steigerwald et al. | 219/10.77 |
| 4,473,732 | 9/1984 | Payne | 219/10.77 |
| 4,560,851 | 12/1985 | Tsukamoto et al. | 219/10.77 |
| 4,698,743 | 10/1987 | Onodera et al. | 363/136 |
| 4,749,836 | 6/1988 | Matsuo et al. | 219/10.77 |
| 4,847,746 | 7/1989 | Rilly et al. | 363/132 |

Primary Examiner—Bruce A. Reynolds
Assistant Examiner—Tu Hoang
Attorney, Agent, or Firm—Browdy and Neimark

[57] ABSTRACT

A dual push-pull induction heating drive circuit comprises an oscillation triggering control circuit regulating the ON-OFF switch of the circuit activation, a switching logic circuit bringing about two exclusive pulse signals serving to drive via an amplifying circuit a dual push-pull switching output circuit having two power elements connected to an induction coil, a pulse width modulating circuit having a controlled comparing element capable of sending out adjustable pulse, and a synchronous detection comparing circuit having at least a comparing element and having an input end in communication with an induction coil and another input end connected with a power source and further having an output end connecting with the switching logic circuit and sending out synchronous pulse signals to a differentiation circuit to bring about synchronous differentiation pulse signals, which are received by the pulse width modulating circuit so as to generate the power control pulse signals serving via the switching logic circuit and the amplifying circuit to drive alternately the two power elements so as to cause the induction coil to bring about high frequency oscillation.

6 Claims, 4 Drawing Sheets

DUAL PUSH-PULL INDUCTION HEATING DRIVE CIRCUIT

BACKGROUND OF THE INVENTION

The present invention relates to a power control circuit of induction heating system, and more particularly to a dual push-pull induction heating drive circuit.

The induction heating principle has been widely employed for general heating purposes. The case in point is an induction cooker, which is selected as an example to illustrate ingenuity and creativity disclosed in the present invention. Therefore, the present invention is not restrictive to an induction cooker.

An induction cooker is a cooking apparatus employing the principle of electromagnetic induction. In other words, the bottom of a cookerware is caused to bring about heat by eddy current induced by an externally applied alternating magnetic field. Such induction cooker has been well received by consumers at large in view of the facts that it does not generate lethal gas of carbon monoxide and that it is easy and safe to use and further that it is relatively heat efficient.

The control principle of an induction cooker of prior art is illustrated in FIG. 1. A pulse signal having a predetermined width is generated by means of an oscillation wavewidth modulator 1 (OSC/PWM) and is subsequently amplified by an amplifying circuit 2 (AMP). The amplified pulse signal is then used to drive a power transistor Q1 to generate continuously a switching action of ON/OFF so as to condition the output induction coil L1 to generate an alternating magnetic field of high frequency, which induces the induction cooker to bring about heat. The induction element L2 and the capacitor C2 are used for filtering. As shown in FIG. 2 illustrating the dynamic voltage current wave form of the power transistor Q1, the time T1 that is required to drive the power transistor Q1 is about 5-25 us. Therefore, the output power of the induction cooker can be changed by adjusting the time T1. In other words, a greater output power is achieved by prolonging the time T1. The time T2 is dependent on the natural resonance frequency formed by the output coil L1 and the capacitor C1 and is on the order of 15us. With the power voltage of 110 V, such induction cooker can generate an output power ranging between 200 W and 1200 W.

If the power supply voltage is increased to 220 V, the output coil L1 of an induction cooker intended to operate on power supply voltage of 110 V must be doubled accordingly. In addition, the capacitance of the capacitor C1 must be reduced by one half so as to permit the time T2 of the power transistor Q1 to remain unchanged. With such adjustments being made, the induction cooker should be able to generate the output power ranging between 220 W and 1200 W. However, such modification is by no means desirable. As far as an induction cooker intended to operate on the power voltage of 110 V is concerned, the maximum collector voltage Vc(max) and collector current Ic of the power transistor Q1 are 650 V and 45 A respectively. As a result, the electric specifications for selecting the power transistor are voltage tolerance Vcbo of 900 V and current tolerance Ic of 60 A. The maximum collector voltage Vc(max) of the power transistor Q1 of an induction cooker operating on the power voltage of 220 V can be doubled if the number of coil of output coil L1 is also doubled in conjunction with a one half reduction in capacitance of the capacitor C1. Therefore, only the power transistor having the voltage tolerance Vcbo of at least 1400V can be used for such modification as described above. The cost of making such modified induction cooker is relatively expensive in view of the fact that the power transistor with Vcbo of 1400 V is rather expensive and difficult to come by.

In order to reduce the production cost of the induction cooker operating on power voltage of 220 V as described above, the number of coil of output coil L1 may be appropriately reduced while the capacitance of the capacitor C1 is increased, thereby resulting in a substantial reduction in the maximum collector voltage Vc(max) of the power transistor Q1. As a result, a power transistor having a lower voltage tolerance Vcbo and having a lower price tag can be selected for use. However, such practice is not desirable, because the power transistor Q1 is subjected to a possible damage caused by the current overload, in view of the facts that the transient current Ict of the power transistor Q1 tends to increase in the wake of alterations made in the output coil L1 and the capacitor C1, and that the time T2 required to drive the power transistor Q1 is shortened to result in a reduction in output power.

It is apparent that an induction cooker of prior art is provided with only one power transistor or single push-pull induction heating drive circuit. The output power of an induction cooker can be increased by means of switching circuits of dual push-pull type, as shown in FIG. 3, in which two power transistors Q1 and Q2 are seen communicating each other. When power transistor Q1 is driven, the current I1 is permitted to pass the power transistor Q1, the induction coil L1 and the capacitor C3. As soon as the power transistor Q2 is driven the current I2 passes through the power transistor Q2, the induction coil L1 and the capacitor C4. As a result, the induction coil L1 generates an alternating magnetic field. The switching circuits of dual push-pull type have been employed in the switching power supply. The load side of the dual push-pull circuit of the switching power supply is rectifying filtering power source of constant frequency. It is therefore suggested that the deed of regulating the control circuits driving the power transistors Q1 and Q2 is a simple matter and that a specialized integrated circuit is available for such application. It is technically difficult to apply the switching circuits of dual push-pull type to an induction cooker in view of the facts that the load side of the induction coil L1 of the dual push-pull circuit is the body of cookware in contrast to the switching power supply in which the load side is a rectifying filtering power source, and that the output power of the induction cooker depends on the modulation of the drive pulse width of dual push-pull switching circuit, which is accomplished by means of a control circuit. It is therefore apparent that an induction cooker can not be suitably provided with control circuits serving to drive alternately the power transistors Q1 and Q2 of dual push-pull circuit of the switching power supply.

The induction cooker of prior art is provided with single push-pull circuit and with a complicated power controlling circuit. On the contrary, the present invention is provided with switching circuit of dual push-pull type to control the mechanism of induction heating with a view to constructing the induction circuit of relatively small size and of high efficiency at a low cost for commercial application.

SUMMARY OF THE INVENTION

It is therefore the primary objective of the present invention to provide a dual push-pull induction heating drive circuit facilitating the use of power elements of high speed and lower voltage tolerance so as to improve the circuit efficiency and to reduce the volume of the-circuit and the cost of making such circuit.

It is another objective of the present invention to provide a dual push-pull induction heating drive circuit of great stability and durability for application to the high-powered induction heating.

In keeping with the principles of the present invention, the foregoing objectives of the present invention are accomplished by an induction heating drive circuit of dual push-pull type, which is characterized mainly in that its control circuit of power output comprises an oscillation triggering control circuit, a switching logic circuit, a dual push-pull switching output circuit, a comparing circuit capable of making synchronous detection, and a pulse width modulating circuit. The oscillation triggering circuit is used to control the threshold oscillation and the termination circuit oscillation of the entire circuit system. The switching logic circuit is used to deliver two exclusive logic signals, which are subsequently amplified by an amplifying drive circuit. The dual push-pull switching output circuit has at least two power elements, which are respectively controlled and alternately driven by the two exclusive logic signals so as to cause an output induction coil to oscillate to generate an alternating magnetic field for use in inducing the load side to bring about induction current to generate heat. The comparing circuit capable of making synchronous detection picks up the synchronous oscillation signals at one end of the dual push-pull switching circuit and at one end of the induction coil, which are compared by the comparing circuit to generate synchronous oscillation pulses, which in turn generate differentiation pulse signals via a differentiation circuit to provide the switching logic circuit with synchronous pulse oscillation signals. The pulse width modulating circuit has a comparing circuit with one end receiving the differentiation pulse signals and with the other end receiving the level voltage from a power initiating feedback circuit dependent on the power so as to control the width of output pulse and to modulate the magnitude of the output power of the dual push-pull switching output circuit. In short, the change in output power is accomplished by means of the comparing circuit capable of making synchronous detection and the switching logic circuit, which enable the two power elements of the dual push-pull switching output circuit to be driven exclusively at high frequency and synchronously enable the pulse width of the pulse width modulating circuit to be adjusted.

DETAILED DESCRIPTION OF THE PREFERRED EMBODIMENT

Figure 4:
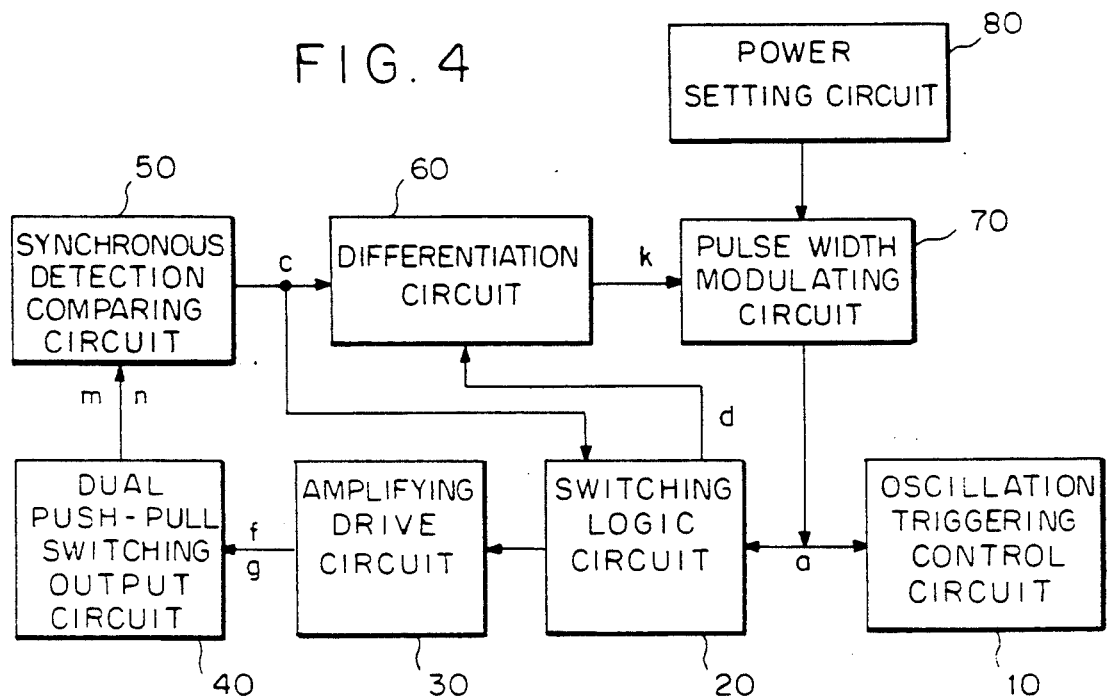
FIG. 4 shows a block diagram of dual push-pull induction heating drive circuit of the present invention.

Referring to FIG. 4, a dual push-pull induction heating drive circuit is shown comprising an oscillation triggering control circuit 10, a switching logic circuit 20, an amplifying drive circuit 30, a dual push-pull switching output circuit 40, a synchronous detection comparing circuit 50, a differentiation circuit 60, a pulse width modulating circuit 70, and a power setting circuit 80.

Figure 5:
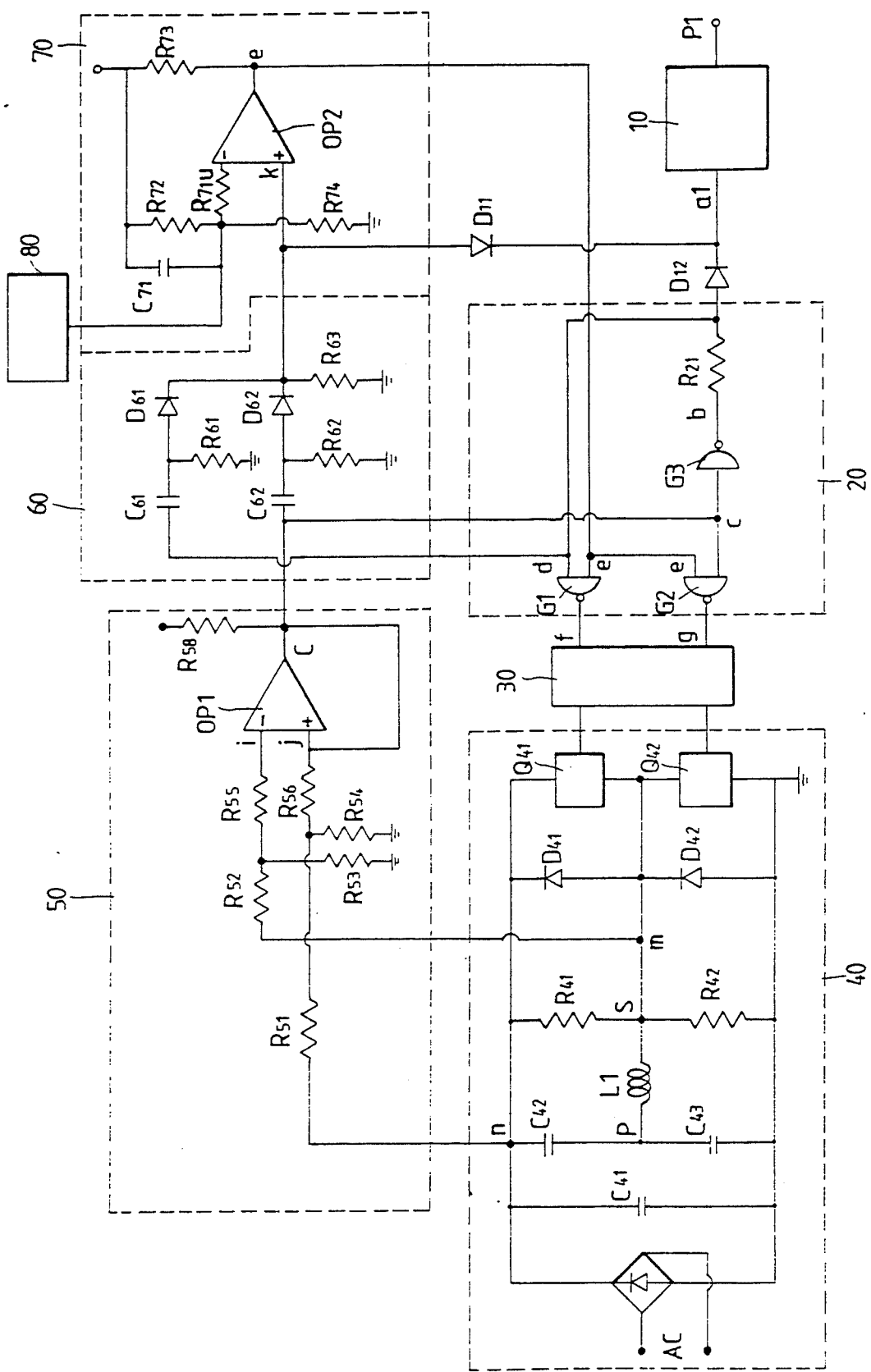
FIG. 5 shows a circuitry of dual push-pull induction heating drive circuit of the present invention.
Figure 6:
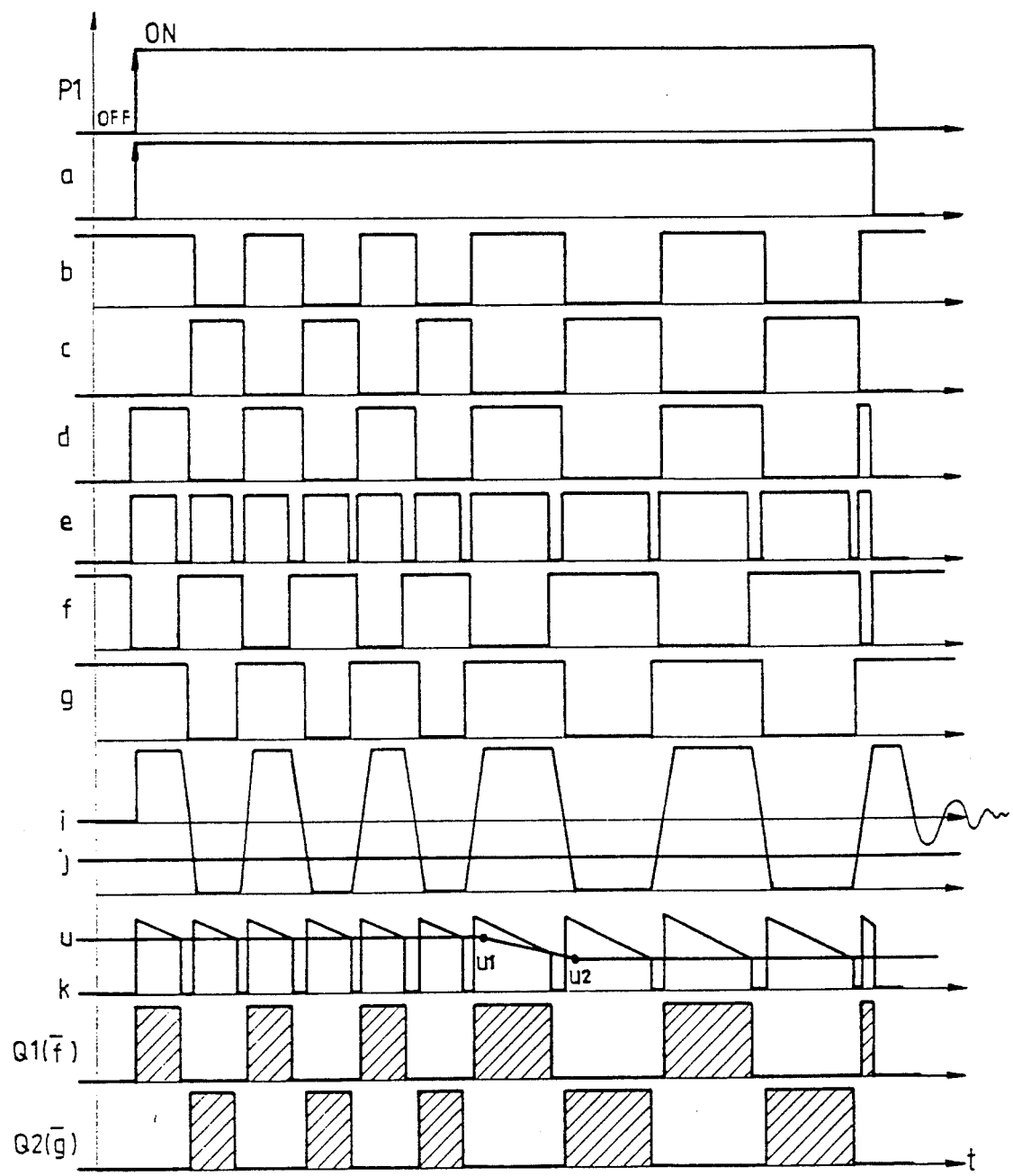
FIG. 6 shows a wave form diagram of main connection points of the circuitry as shown in FIG. 5.

Now referring to FIGS. 5 and 6, the oscillation triggering control circuit 10 is responsible for controlling the activation of threshold oscillation and the ON-OFF control of oscillation. As shown in FIG. 6, the output of points a1 and p1 are of high potential at the time when the power supply starts. The entire circuit system stops oscillating immediately, once the points a1 and p1 become low potential. The circuit 10 is beyond the scope of the present invention and will not be described further.

The switching logic circuit 20 comprises two NAND gates G1 and G2 (or AND gates), a NOT gate G3, and a resistor R21. The input points d and e of G1 are connected respectively with the differentiation circuit 60 and the pulse width modulating circuit 70.

The amplifying drive circuit 30 is the same as that of prior art and is used to amplify the logic signals at f and g points so as to drive the two power elements of the dual push-pull switching output circuit 40.

The dual push-pull switching output circuit 40 is composed of two power elements Q41 and Q42, an induction coil L1, two diodes D41 and D42, two resistors R41 and R42, and three capacitors C41, C42 and C43. The power elements may be of high speed MOSFET (metal oxide semiconductor field effect transistor) or IGBT (insulated gate bipolar transistor) or bipolar transistor which is less effective. The power elements Q41 and Q42 are driven by the amplifying drive circuit 30 to communicate each other in an alternating manner that the induction coil L1 is caused to generate an alternating magnetic field.

The synchronous detection comparing circuit 50 comprises a comparator OP1 and a plurality of resistors R51, R52 ... R58. The two input ends of the comparator OP1 are connected respectively with the power source n point of the dual push-pull switching output circuit 40 and the m point of the induction coil so as to detect the synchronous oscillation signal. The output end c of the comparator OP1 is connected with the switching logic circuit 20 and the differentiation circuit 60.

The differentiation circuit 60 comprises two capacitors C61 and C62, three resistors R61, R62 and R63, and two diodes D61 and D62, which jointly form two sets of differentiation circuits. The input end of the differentiation circuit 60 is in communication with the c and d points of the switching logic circuit 20, while the output end k is connected with the pulse width modulating circuit 70.

The pulse width modulating circuit 70 comprises mainly a comparator OP2, and resistors R71, R72, R73 and R74, and a capacitor C71, with its input end k receiving the wave form signal of differential oscillation synchronous with the dual push-pull switching output circuit 40, and with its other input end u connecting with the power setting circuit 80.

The power setting circuit 80 is used to alter the voltage level of the input comparator OP2(−) in accordance with the power modulation and further to change the output power of the system. The power initiating feedback circuit 80 is intended mainly to bring about the direct current voltage level changeable by control and is familiar to those skilled in the art. It is beyond the scope of the present invention and will not be therefore described further.

The operational principles and effects of the dual push-pull induction heating drive circuit of the present invention are explained hereinafter.

The P1 input point is of high potential at the time when the power supply starts; the point a1 changes from low potential to high potential via the oscillation triggering control circuit 10. In other words, the system is turned on so as to activate the dual push-pull switching output circuit 40 to begin oscillating. That is to say that the point a1 is used to turn on or off the circuit. As soon as the power supply of the system is cut off, the high potential of the point a1 is reverted to the low potential, thereby resulting in a cessation of oscillation by the entire circuit.

The point c of the switching logic circuit 20 receives from the synchronous detection comparing circuit 50 the oscillating pulse signal, which is synchronous with the dual push-pull circuit and is received by NAND gate G2 on the one hand and by NAND gate G1 from the point d via NOT gate G3 in an opposite direction on the other hand. As a result, the widths of pulse signal at the output points f and g of the received exclusive signals of G1 and G2 are controlled by the point e or by the pulse width modulating circuit 70.

The output signals sent out at points f and g of the switching logic circuit 20 are amplified by the amplifying drive circuit 30 so as to drive the power elements Q41 and Q42 to cause the induction coil L1 of the output power to receive the current flowing alternately in different directions. When the power element Q41 is turned on, with the other power element Q42 being turned off, the current I1 flows through the induction coil L1. When the power element Q42 is on, with the power element Q41 remaining off, the current I2 passes through the induction coil L1. Therefore, the induction coil L1 generates magnetic field of high frequency to bring about the heating of the cookware (not shown in the drawings provided herein).

The comparator OP1 of the synchronous detection comparing circuit 50 receives the oscillating signal from the point m of the induction coil L1 of the dual push-pull switching output cirucit 40 and from the point n of the power source. The point i picks up the input synchronous oscillating signal of high frequency (about 30 KHZ) while the point j receives the input power source oscillating signal of low frequency (about 60 HZ). Through the comparator OP1, these two signals produce the synchronous pulse signals of the point c.

The synchronous pulse signals are sent to the switching logic circuit 20 and in the meantime produce via a differentiation circuit 60 the synchronous differential pulse waveform signals, which enter at the point k into the pulse width modulating circuit 70.

The differential waveform signals of the point k and the voltage level signal of the power setting circuit 80 are received by the comparator OP2 to produce the pulse waveform signal of a predetermined width at the point e. The pulse width is used to control the time that is needed to drive the power elements to communicate each other. In other words, the pulse width is intended for use in controlling the magnitude of the effective output power. For example, as shown in FIG. 6, when the output level (the point U) of the power setting circuit 80 drops from U1 to U2, the output pulse width of the point e increases so as to increase the output power. As a result, the oscillating frequency of the entire circuitry is modulated synchronously, and the alteration of oscillating frequency and the control of magnitude of power generated by high frequency oscillation of the dual push-pull circuit take place synchronously.

Figure 7:
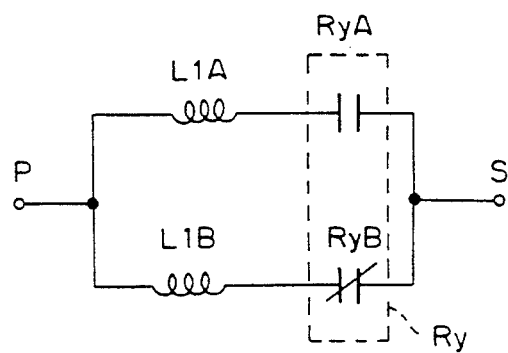

As shown in FIG. 7, located between the points p and m of the dual push-pull switching output circuit 40 are two parallel induction coils L1A and L1B. The induction coil L1A has one end which is connected to a normal open RYA of a relay (RY) while another induction coil L1B is provided with one end which is connected to a normal close RYB of the same relay (RY). The action of the relay (RY) is controlled by control circuit so as to induce these two induction coils L1A and L1B to generate alternating magnetic fields to enhance the power output.

It has now become apparent that the circuit design of induction cooker of the present invention is completely different from that of induction cooker of the prior art. In other words, the circuit design of the present invention is characterized in that its dual push-pull circuit is driven to make high frequency operation by means of cooperating effort of the synchronous detection comparing circuit and the switching logic circuit, and that it is designed to modulate the output power by changing the pulse frequency and in the meantime by maintaining the stability of the circuit, and further that it is designed to make use of high-speed power elements, such as insulated gate bipolar transistor (IGBT) and MOSFET (metal oxide semiconductor field effect trqansistor), and still further that it is capable of generating a high output power of 2000 W or over by using the regular power elements.

The circuit design of induction cooker of the present invention has advantages over that of induction cooker of the prior art, which are described hereinafter.

Figure 1:
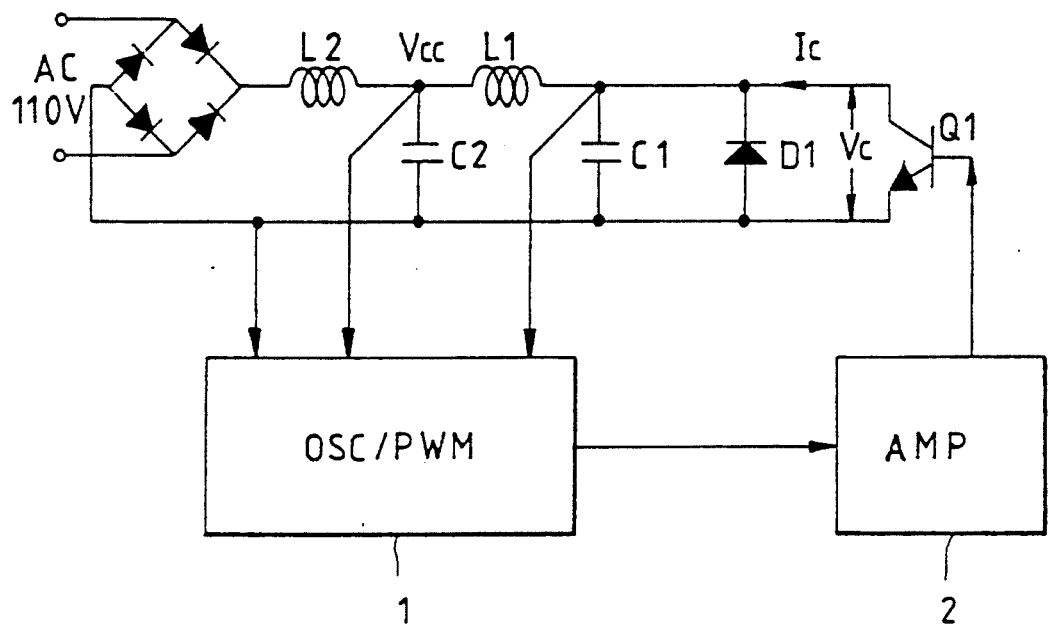
FIG. 1 shows a simplified circuit diagram of an induction cooker of prior art.
Figure 2:
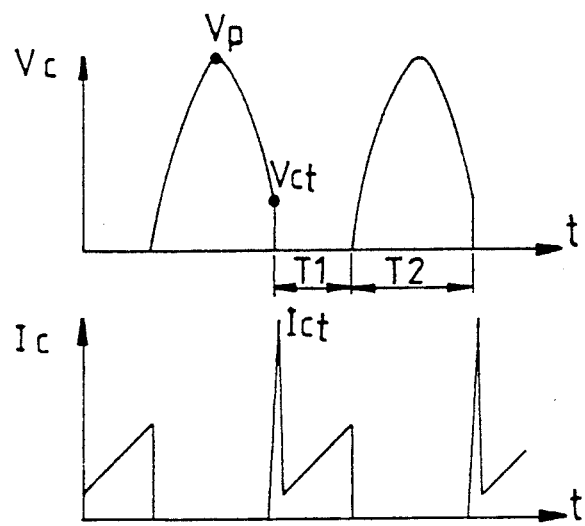
FIG. 2 shows a wave form diagram of voltage and current of the power transistor Q1 as shown in FIG. 1.
Figure 3:
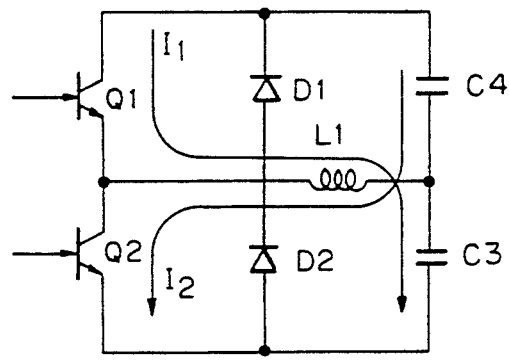
FIG. 3 shows a schematic diagram of dual push-pull circuit of prior art.

As shown in FIG. 1, the prior art induction cooker operating on power supply of 220 V must make use of power transistor having the voltage tolerance of 1400 V because of the fact that its induced voltage has a transient crest value of 1200 V, which is calculated as follows:

$$Vp(max) = \sqrt{L1/C1 \cdot I^2} + Vcc = 1200 \text{ V}$$

On the other hand, the induced voltage of induction cooker of the present invention operating on power supply of 220 V has a transient crest value which is constantly smaller than the power supply voltage Vcc. If we take the safety coefficient of 1.3 into consideration, we can calculate the demanded voltage tolerance of its power element as follows:

$$Vp(max) = Vcc \cdot \sqrt{2} \cdot 1.3 = 400 \text{ V}$$

As a result, the induction cooker of the present invention permits the employment of such high-speed power elements as MOSFET or IGBT and is therefore more efficient, smaller in size, cheaper to make, and less vulnerable to heat loss.

The synchronous detection comparing circuit of the present invention is unique in that it simplifies the pulse width modulating circuit which controls the output power, and that it operates synchronously with the dual push-pull oscillation circuit. In addition, the structure and the stability of the circuitry of the present invention are ensured by virture of the facts that the switching logic circuit causes the action pulse signals of the two power elements of the dual push-pull oscillation circuit to be just opposite, and that the output pulse widths are modulated synchronously.

The embodiment of the present invention described above is to be considered in all respects as merely illustrative and not restrictive. Accordingly, the present invention is to be limited only by the scope of the hereinafter appended claims.

What is claimed is:

1. A dual push-pull induction heating drive circuit comprising:
    an oscillation triggering control circuit, connected by means of a signal line with a switching logic circuit which sends out two oscillation signals that pass through an amplifying drive circuit and drive a dual push-pull switching output circuit provided with at least two power elements connected with an induction coil; and
    a pulse width modulating circuit having a comparing element controlled to send out pulses with widths capable of being modulated, said pulses serving via said switching logic circuit and said amplifying drive circuit to drive alternately said power elements to cause said induction coil to generate an alternating magnetic field, and
    wherein a synchronous detection comparing circuit having at least a comparing element is provided with two input ends thereof connected respectively with two ends of said induction coil, said comparing element having an output end sending out a synchronous pulse signal received by said switching logic circuit and a differentiation circuit to bring synchronous differentiation pulse signal received by an input end of said comparing element of said pulse width modulating circuit to generate power control pulse signal intended to drive alternately said two power elements via said switching logic circuit and said amplifying circuit to cause said induction coil to bring about high frequency oscillation.

2. A dual push-pull induction heating drive circuit according to claim 1 wherein said switching logic circuit has two AND gates and a NOT gate, one of said two AND gates having an input end receiving said synchronous pulse signal sent out by said synchronous detection comparing circuit, gate another one of said two AND gates having an input end receiving a pulse signal which is converted into an opposite phase signal by said NOT gate, with said opposite phase signal being opposite to said synchronous pulse signal, said two AND gates having other input ends receiving simultaneously said pulse signals from said pulse width modulating circuit so as to ensure that said two AND gates send out two exclusive pulse signals of opposite polarities capable of regulating pulse width.

3. A dual push-pull induction heating drive circuit according to claim 1 wherein said switching logic circuit and said pulse width modulating circuit are connected with an oscillation triggering control circuit.

4. A dual push-pull induction heating drive circuit according to claim 1 wherein said dual push-pull switching output circuit is provided with two parallel induction coils, one of which has an end in communication with a normal open of a relay while another has an end communicating with a normal close of said relay.

5. A dual push-pull induction heating drive circuit according to claim 1 wherein said two power elements are insulated gate bipolar transistors.

6. A dual push-pull induction heating drive circuit according to claim 1 wherein said two power elements are metal oxide semiconductor field effect transistors.

* * * * *